United States Patent
Chandra et al.

(10) Patent No.: US 9,979,935 B2
(45) Date of Patent: May 22, 2018

(54) IMAGE SENSOR DEVICE WITH MACROPIXEL PROCESSING AND RELATED DEVICES AND METHODS

(71) Applicant: STMicroelectronics International N.V., Schiphol (NL)

(72) Inventors: Mahesh Chandra, Ghaziabad (IN); Brejesh Lall, New Delhi (IN)

(73) Assignee: STMICROELECTRONICS INTERNATIONAL N.V., Amsterdam (NL)

( * ) Notice: Subject to any disclaimer, the term of this patent is extended or adjusted under 35 U.S.C. 154(b) by 0 days. days.

(21) Appl. No.: 15/730,312

(22) Filed: Oct. 11, 2017

(65) Prior Publication Data
US 2018/0035086 A1    Feb. 1, 2018

Related U.S. Application Data

(63) Continuation of application No. 14/836,143, filed on Aug. 26, 2015, now Pat. No. 9,819,913.

(51) Int. Cl.
| | |
|---|---|
| *H04N 9/45* | (2006.01) |
| *H04N 5/347* | (2011.01) |
| *H04N 9/04* | (2006.01) |

(52) U.S. Cl.
CPC ............. *H04N 9/045* (2013.01); *H04N 5/347* (2013.01)

(58) Field of Classification Search
CPC ........................................................ H04N 9/45
USPC .......................................................... 348/294
See application file for complete search history.

(56) References Cited

U.S. PATENT DOCUMENTS

| | | |
|---|---|---|
| 5,416,612 A | 5/1995 | Ingraham et al. |
| 7,983,495 B2 | 7/2011 | Nakai et al. |
| 8,374,427 B2 | 2/2013 | Tsai |
| 8,681,185 B2 | 3/2014 | Guncer |
| 8,681,186 B2 | 3/2014 | Park |
| 2006/0083432 A1* | 4/2006 | Malvar ................... H04N 1/64 382/232 |
| 2009/0051687 A1 | 2/2009 | Kato et al. |
| 2009/0057544 A1 | 3/2009 | Brodie et al. |
| 2014/0354778 A1* | 12/2014 | Kolar ....................... G06T 1/20 348/46 |

* cited by examiner

*Primary Examiner* — Joel Fosselman
(74) *Attorney, Agent, or Firm* — Slater Matsil, LLP

(57) ABSTRACT

An image sensor device may include an array of image sensing pixels with adjacent image sensing pixels being arranged in macropixel, and a processor coupled to the array of image sensing pixels. The processor may be configured to receive pixel signals from the array of image sensing pixels, and arrange the received pixel signals into macropixel signal sets for respective macropixels. The processor may be configured to perform, in parallel, an image enhancement operation on the received pixel signals for each macropixel signal set to generate enhanced macropixel signals, and transmit the enhanced macropixel signals.

20 Claims, 4 Drawing Sheets

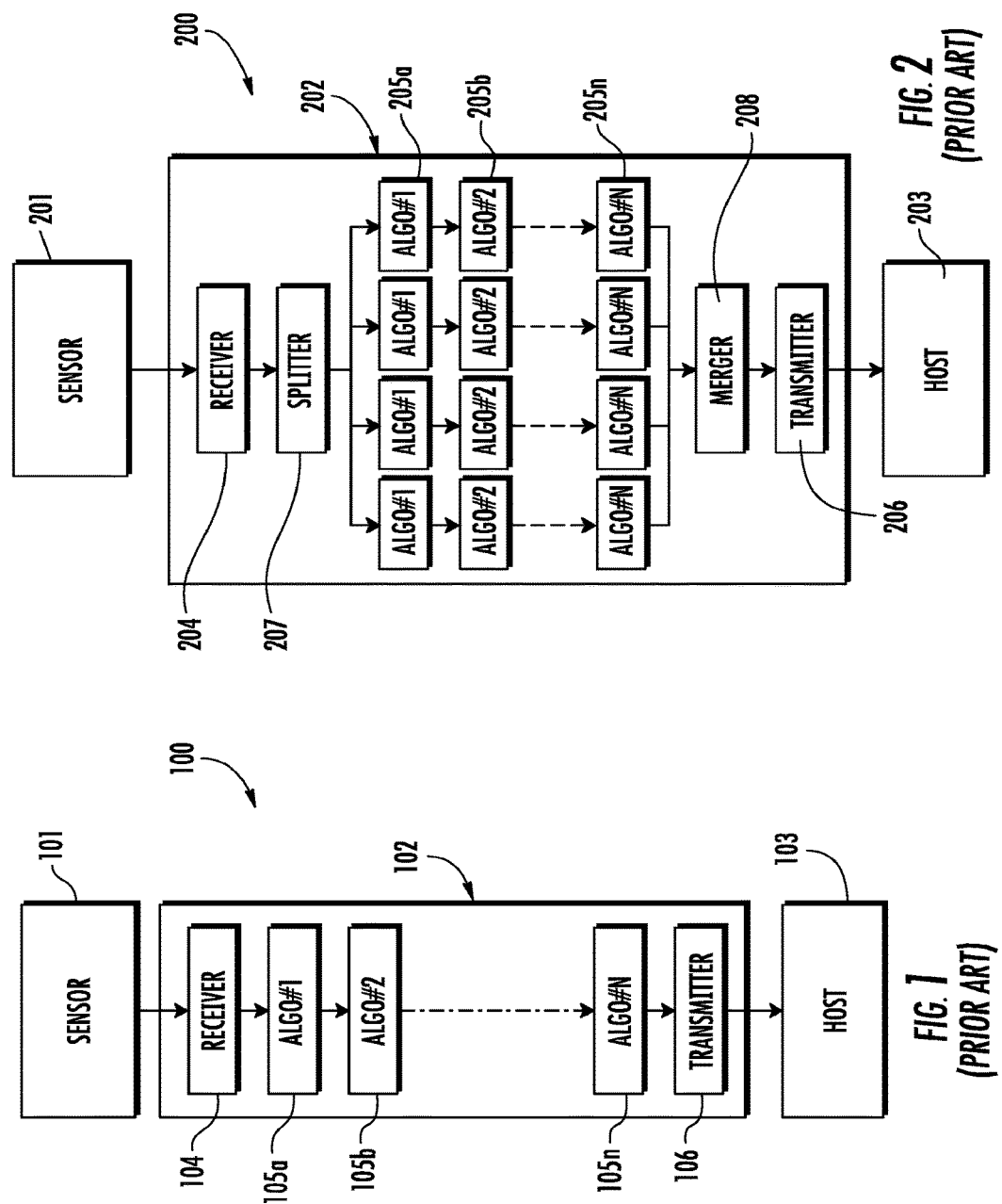

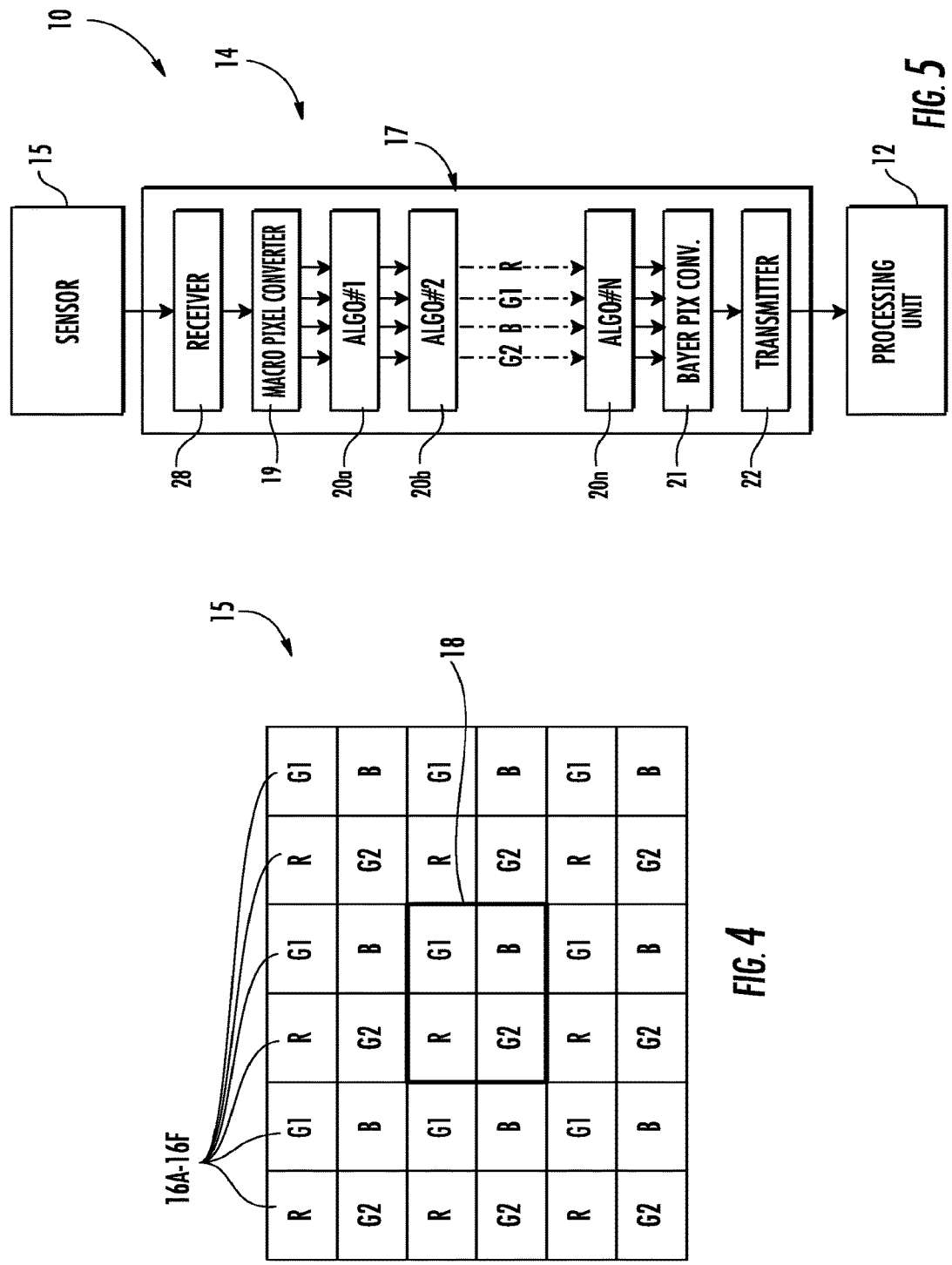

IMAGE SENSOR DEVICE WITH MACROPIXEL PROCESSING AND RELATED DEVICES AND METHODS

CROSS-REFERENCE TO RELATED APPLICATIONS

This application is a continuation of U.S. application Ser. No. 14/836,143, filed on Aug. 26, 2015, which application is hereby incorporated herein by reference.

TECHNICAL FIELD

The present disclosure relates to the field of integrated circuits, and, more particularly, to an image sensor device and related methods.

BACKGROUND

Typically, electronic devices include one or more camera modules for providing enhanced media functionality. For example, the typical electronic device may utilize the camera modules for photo capturing and video teleconferencing. In the typical electronic device with multiple camera modules, the primary camera module has a high pixel density and an adjustable focus lens system, while the secondary camera module is front-facing and has a lower pixel density. Also, the secondary camera module may have a fixed focus lens system.

For example, U.S. Patent Application No. 2009/0057544 to Brodie et al., assigned to the present application's assignee, discloses a camera module for a mobile device. The camera module comprises a lens, a housing carrying the lens, and a lens cap over the lens and housing. The camera module includes a barrel mechanism for adjusting the lens. Each camera module comprises an integrated circuit (IC) image sensor device having a plurality of pixels arranged in an array of rows and columns, a plurality of pixel lines coupled to the plurality of pixels, and readout circuitry coupled to the plurality of pixel lines.

Referring to FIG. 1, a typical electronic device 100 is now described. The electronic device 100 includes an image sensor array 101, a processor 102 coupled to the image sensor array, and a host device 103 coupled to the processor. The processor 102 includes a receiver module 104, a plurality of processing modules 105a-105n coupled in succession downstream from the receiver module, and a transmitter module 106 coupled downstream from the plurality of processing modules.

Referring to FIG. 2, another typical high performance (i.e. having higher pixel processing power) electronic device 200 is now described. The electronic device 200 includes an image sensor array 201, a processor 202 coupled to the image sensor array, and a host device 203 coupled to the processor. The processor 202 includes a receiver module 204, and a splitter module 207 coupled downstream from the receiver module and for dividing the data into one or more stripes of data. The processor 202 includes a plurality of pipelines coupled to the splitter module 207, each pipeline comprising a plurality of processing modules 205a-205n coupled in succession. The electronic device 200 includes a merger module 208 coupled downstream from the plurality of pipelines, and a transmitter module 206 coupled downstream from the merger module.

SUMMARY

Generally speaking, an image sensor device may include an array of image sensing pixels with adjacent image sensing pixels being arranged in macropixels, and a processor coupled to the array of image sensing pixels. The processor is configured to receive pixel signals from the array of image sensing pixels, arrange the received pixel signals into a plurality of macropixel signal sets for respective macropixels, perform, in parallel, at least one image enhancement operation on the received pixel signals for each macropixel signal set to generate enhanced macropixel signals, and transmit the enhanced macropixel signals. Advantageously, the image sensor device may process data more efficiently and with a lower clock speed.

More specifically, the plurality of macropixel signal sets may comprise a plurality of Bayer macropixel signal sets. The image sensor device may further comprise a Bayer color filter array over the array of image sensing pixels. Each of the received pixel signals for each macropixel signal set may represent an individual color. The processor may be configured to perform the at least one image enhancement operation on each individual color.

For example, the at least one image enhancement operation may comprise a brightness control operation. Each macropixel may comprise a 2×2 set of individual pixels. The processor may be configured to merge the enhanced macropixel signals into an image. The array of image sensing pixels may comprise a complementary metal-oxide semiconductor (CMOS) image sensor array.

Another aspect is directed to an electronic device comprising a processing unit and associated memory, and an image sensor device coupled to the processing unit. The image sensor device may comprise an array of image sensing pixels with adjacent image sensing pixels being arranged in macropixels, and a processor coupled to the array of image sensing pixels and configured to receive pixel signals from the array of image sensing pixels, and arrange the received pixel signals into a plurality of macropixel signal sets for respective macropixels. The processor may be configured to perform, in parallel, at least one image enhancement operation on the received pixel signals for each macropixel signal set to generate enhanced macropixel signals, and transmit the enhanced macropixel signals.

Another aspect is directed to a method of operating an image sensor device comprising an array of image sensing pixels with adjacent image sensing pixels being arranged in macropixels, and a processor coupled to the array of image sensing pixels. The method may include operating the processor to receive pixel signals from the array of image sensing pixels, and operating the processor to arrange the received pixel signals into a plurality of macropixel signal sets for respective macropixels. The method may include operating the processor to perform, in parallel, at least one image enhancement operation on the received pixel signals for each macropixel signal set to generate enhanced macropixel signals, and operating the processor to transmit the enhanced macropixel signals.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a schematic diagram of an electronic device, according to the prior art.

FIG. 2 is a schematic diagram of another electronic device, according to the prior art.

FIG. 4 is a schematic diagram of an array of image sensing pixels with a Bayer filter from the electronic device of FIG. 3.

FIG. 5 is a detailed schematic diagram of an electronic device, according to the present disclosure.

DETAILED DESCRIPTION OF ILLUSTRATIVE EMBODIMENTS

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout.

Figure 3:
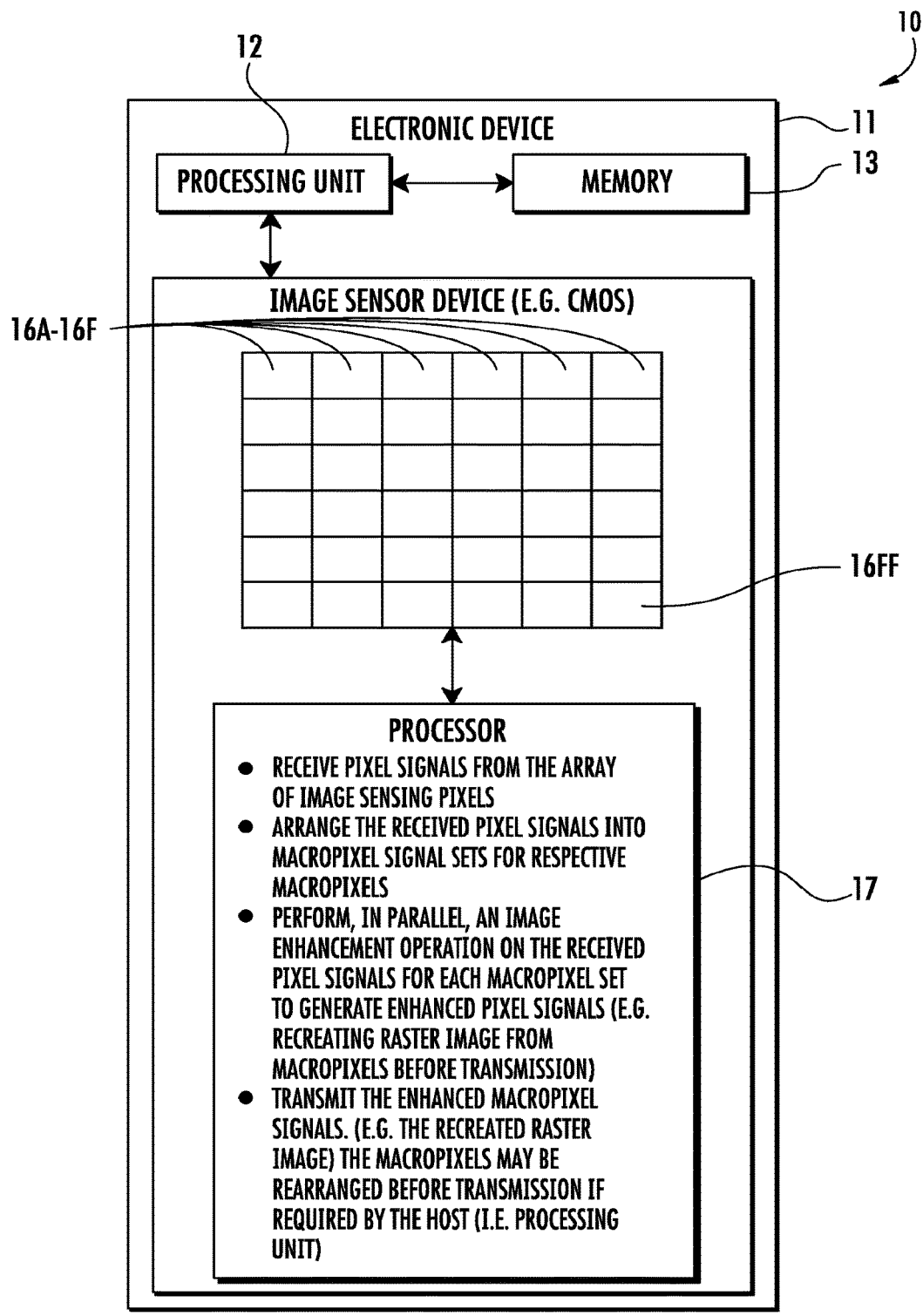
FIG. 3 is a schematic diagram of an electronic device, according to the present disclosure.

Referring initially to FIGS. 3-4, an electronic device 10 according to the present disclosure is now described. The electronic device 10 illustratively includes a processing unit 12 (e.g. multi-core system on chip device) and associated memory 13, and an image sensor device 14 coupled to the processing unit. As will be appreciated by the skilled person, the processing unit 12 may comprise a host device, such as a mobile cellular device or a tablet computing device. The electronic device 10 illustratively includes a housing 11 carrying the image sensor device 14, the processing unit 12, and the memory 13.

The image sensor device 14 illustratively includes an array 15 of image sensing pixels 16a-16ff with adjacent image sensing pixels being arranged in macropixels 18, and a processor (i.e. the image signal processor (ISP)) 17 coupled to the array of image sensing pixels. For example, the array 15 may comprise a complementary metal-oxide semiconductor (CMOS) image sensor array. The processor 17 and the array 15 of image sensing pixels 16a-16ff may comprise a single IC, or in the alternative, each component may be on separate ICs.

As perhaps best seen in FIG. 4, each macropixel 18 illustratively includes a 2×2 macropixel. Of course, in other embodiments, the macropixel 18 may have other dimensions, such as 3×3, 4×4, 2×4, etc. The image sensor device 14 illustratively includes a Bayer color filter over the array 15 of image sensing pixels 16a-16ff. Of Course, in other embodiments, the image sensor device 14 may comprise other types of filters alternatively or additionally. In particular, the plurality of macropixel signal sets comprises a plurality of Bayer macropixel signal sets. Each of the received pixel signals for each macropixel signal set illustratively represents an individual color. In Bayer filter embodiments, each macropixel set comprises a red signal R, a blue signal B, and first and second green signals G1, G2.

Referring now additionally to FIG. 5, the processor 17 illustratively includes a receiver module 28 configured to receive pixel signals (i.e. data) from the array 15 of image sensing pixels 16a-16ff. The pixel signals may be formatted as a raster scan pattern image, but other formats can be used. The processor 17 illustratively includes a macropixel converter module 19 configured to convert the pixels signals from the receiver module 28 into a plurality of macropixel signal sets, each macropixel signal set being for a respective macropixel 18. The processor 17 illustratively includes a plurality of image enhancement operation modules 20a-20n (defining an image enhancement pipeline), each configured to perform a respective image enhancement operation of the plurality of macropixel signal sets.

As illustrated, the processor 17 is configured to perform, in parallel, the plurality of image enhancement operations on the received pixel signals for each macropixel signal set to generate enhanced macropixel signals. In other words, in the illustrated embodiment, the four Bayer signals (R, B, G1, G2) of each macropixel signal set are processed in parallel. Additionally, the processor 17 sequentially feeds the plurality of macropixel signal sets into the plurality of image enhancement operation modules 20a-20n. Hence, each image enhancement operation module 20a-20n of the image enhancement pipeline is working on a single macropixel signal set at a time in each clock cycle period.

The processor 17 illustratively includes a macropixel converter module 21 downstream from the plurality of image enhancement operation modules 20a-20n and configured to covert the sequential plurality of macropixel signal sets into formatted image data (i.e. back to the original format before division into macropixels 18). The processor 17 illustratively includes a transmitter module 22 downstream from the macropixel converter module 21 and configured to transmit the enhanced macropixel signals as formatted image data (e.g. raster image data).

Figure 6:
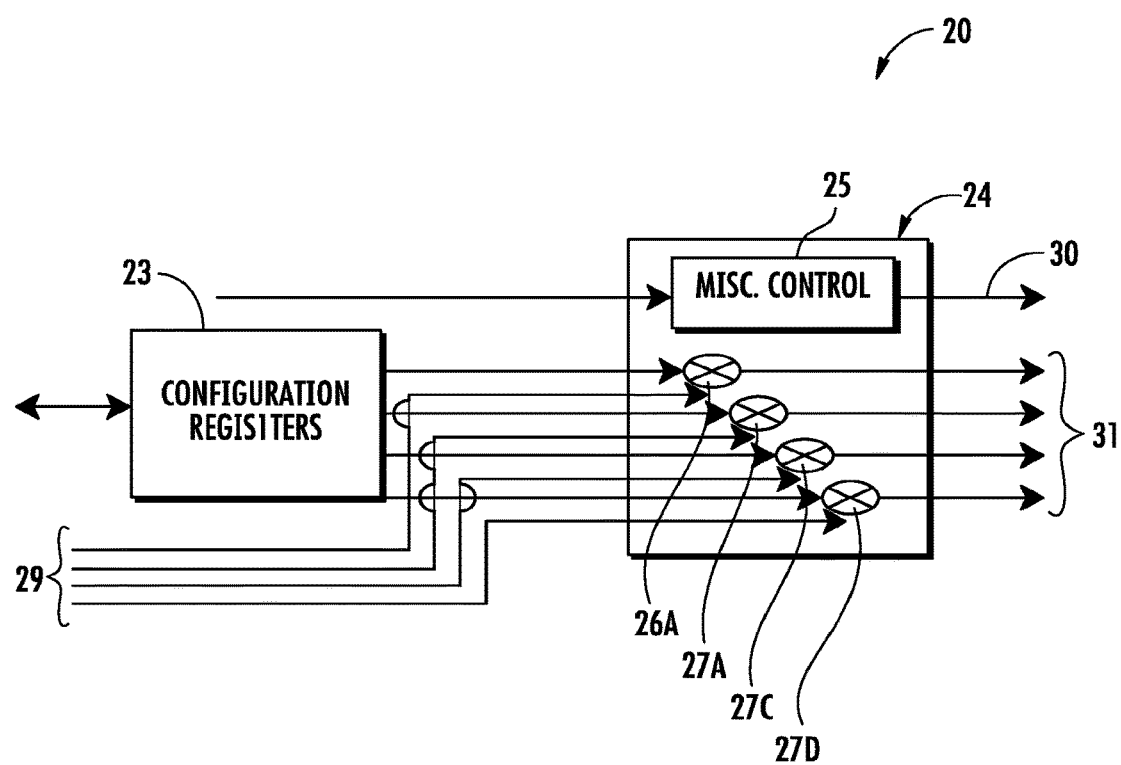
FIG. 6 is a schematic diagram of an image enhancement operation module from the electronic device of FIG. 5, according to the present disclosure.

Referring now additionally to FIG. 6, an example image enhancement operation module 20 is shown. Here, the image enhancement operation module 20 comprises an image gain operation circuit (i.e. brightness control). The image enhancement operation module 20 is configured to perform the image enhancement operation on each individual color for the plurality of macropixel signal sets, i.e. an input 29. The image enhancement operation module 20 illustratively includes configuration registers 23 for storing operational parameters, and a gain circuit 24 coupled to the configuration parameters. The gain circuit 24 illustratively includes a plurality of mixers 26a-26d respectively receiving the signals for each macropixel signal set, and controller 25 controlling a data path 30. The gain circuit 24 is configured to output an enhanced plurality of macropixel signal sets, i.e. an output 31. Advantageously, the gain circuit 24 may apply individual gain factors to each color signal.

Another aspect is directed to a method of operating an image sensor device 14 comprising an array 15 of image sensing pixels 16a-16ff with adjacent image sensing pixels being arranged in macropixels 18, and a processor 17 coupled to the array of image sensing pixels. The method includes operating the processor 17 to receive pixel signals from the array 15 of image sensing pixels 16a-16ff, and operating the processor to arrange the received pixel signals into a plurality of macropixel signal sets for respective macropixels 18. The method includes operating the processor 17 to perform, in parallel, at least one image enhancement operation on the received pixel signals for each macropixel signal set to generate enhanced macropixel signals, and operating the processor to transmit the enhanced macropixel signals.

In typical approaches, most CMOS image sensors capture images using the Bayer color filter. This filtering may be processed before the image can be displayed or encoded for storage or transmission. An ISP is used to process these images. With increasing resolution and/or increasing the frame rate, these images must be processed rapidly. This may require the ISP to run at a very high clock frequency, which poses issues in physical implementation and increases the power consumption significantly. The herein disclosed electronic device 10 provides an approach to a low power image processing pipeline, which processes the pixels captured by the sensors using Bayer color filters.

The input image for the ISP may be in the Bayer format, requiring a pattern of 2×2 pixels to reconstruct the three color components. The ISP implements various image enhancement operations by processing the individual pixels. With increasing megapixels and/or the frame rate, there is a need to run these ISPs at a very high clock frequency. For example, moving from a 5 megapixel to a 16 megapixel imaging device operating at 30 fps, the minimum clock frequency requirement changes from 150 MHz to 480 Mhz. Apart from posing the challenge for timing closure, it also affects the power consumption. The later one is an important issue that must be addressed for low power systems (i.e. the systems that are "always on", e.g. gesture recognition, security cameras and the systems that operate on battery, such as mobile phones).

In the typical approach of FIG. 2, the input image is stored in the memory and split in vertical stripes for processing. These stripes are processed independently and stitched together later to form a complete image. This concept can be extended for power saving and instead of a single processing pipeline running at a very high frequency, multiple pipelines can be used to reduce the operating frequency. For example, the illustrated four pipelines will allow the maximum clock frequency to be reduced to 25% of the original frequency. This may allow the design to be implemented at a lower supply voltage, and the design can be closed with higher VT cells. Due to this, both the dynamic range and current leakage may be reduced, and low power implementation is made possible.

Advantageously, the electronic device 10 also reduces the operational clock speed to 25%, but with reduced circuit resources. Also, in the disclosed electronic device 10, the power consumption depends on the switching rate. By processing a macropixel 18, similar color pixels are processed through the pipeline as opposed to all colors using same pipeline in other approaches. In natural images, the change between adjacent pixels of same color is less than that of the adjacent pixels of different color. Due to this, the dynamic power consumption will be less in a macropixel processing block than having four parallel pipelines working on Bayer image, as in the approach of FIG. 2.

Moreover, the duplication of logic circuitry is reduced in the electronic device 10, as compared to the parallel architecture as the configuration registers 23, for example, are not replicated. This may reduce the silicon real estate consumed by the processor 17. In the electronic device 10, programming overhead may be small because there are no stripes to manage (as in FIG. 2). In particular, in the approach of FIG. 2, the offsets must be correctly programmed for each stripe. Also, the electronic device 10 is more intuitive and fits naturally with some processing blocks, which work on macro-pixels to reduce the artifacts.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An image sensor device, comprising:
   an array of image sensing pixels comprising a plurality of macropixels, wherein each macropixel comprises adjacent image sensing pixels; and
   a processor coupled to the array of image sensing pixels, the processor being configured to:
   receive data from the array of image sensing pixels;
   convert the data into a plurality of macropixel signal sets, each macropixel signal set being for a respective macropixel of the array of image sensing pixels, each macropixel signal set comprising a plurality of individual signals;
   sequentially feed the plurality of macropixel signal sets into a plurality of sequential image enhancement operations; and
   perform, for each macropixel signal set, the plurality of sequential image enhancement operations on the plurality of individual signals to produce enhanced macropixel signals, each of the plurality of sequential image enhancement operations being performed on the plurality of individual signals in parallel.

2. The image sensor device of claim 1, wherein the processor is further configured to merge the enhanced macropixel signals into an image, and transmit the image.

3. The image sensor device of claim 1, wherein the data is formatted as a raster scan pattern image of the array of image sensing pixels.

4. The image sensor device of claim 1, wherein the plurality of macropixel signal sets comprises a plurality of Bayer macropixel signal sets.

5. The image sensor device of claim 1, further comprising a Bayer color filter array over the array of image sensing pixels.

6. The image sensor device of claim 1, wherein the plurality of sequential image enhancement operations comprises a brightness control operation.

7. The image sensor device of claim 1, wherein each macropixel comprises a 2-by-2 array of adjacent image sensing pixels.

8. The image sensor device of claim 1, wherein the plurality of individual signals comprises a plurality of individual colors.

9. The image sensor device of claim 1, wherein each macropixel signal set comprises a red signal, a blue signal, a first green signal, and a second green signal.

10. An electronic device comprising:
    a processing unit;
    memory coupled to the processing unit; and
    an image sensor device coupled to the processing unit, the image sensor device comprising:
    an array of image sensing pixels comprising a plurality of macropixels, wherein each macropixel comprises adjacent image sensing pixels; and
    a processor coupled to the array of image sensing pixels, the processor being configured to:
    receive data from the array of image sensing pixels;
    convert the data into a plurality of macropixel signal sets, each macropixel signal set being for a respective macropixel of the array of image sensing pixels, each macropixel signal set comprising a plurality of individual signals;

sequentially feed the plurality of macropixel signal sets into a plurality of sequential image enhancement operations; and perform, for each macropixel signal set, the plurality of sequential image enhancement operations on the plurality of individual signals, each of the plurality of sequential image enhancement operations being performed on the plurality of individual signals in parallel.

11. The electronic device of claim 10, wherein the plurality of individual signals comprises a plurality of individual colors.

12. The electronic device of claim 10, further comprising a Bayer color filter array over the array of image sensing pixels.

13. The electronic device of claim 10, wherein each macropixel comprises a 2×2 array of adjacent image sensing pixels.

14. The electronic device of claim 10, wherein each macropixel signal set comprises a red signal, a blue signal, a first green signal, and a second green signal.

15. The electronic device of claim 10, wherein the plurality of sequential image enhancement operations comprises a brightness control operation.

16. A method, comprising:

receiving data from an array of image sensing pixels, the array of image sensing pixels comprising a plurality of macropixels, wherein each macropixel comprises adjacent image sensing pixels;

converting the data into a plurality of macropixel signal sets, each macropixel signal set being for a respective macropixel of the array of image sensing pixels, each macropixel signal set comprising a plurality of individual signals;

sequentially feeding the plurality of macropixel signal sets into a plurality of sequential image enhancement operations; and performing, for each macropixel signal set, the plurality of sequential image enhancement operations on the plurality of individual signals to produce enhanced macropixel signals, each of the plurality of sequential image enhancement operations being performed on the plurality of individual signals in parallel.

17. The method of claim 16, further comprising merging the enhanced macropixel signals into an image, and transmitting the image.

18. The method of claim 16, wherein the plurality of macropixel signal sets comprises a plurality of Bayer macropixel signal sets.

19. The method of claim 16, wherein the plurality of sequential image enhancement operations comprises a brightness control operation.

20. The method of claim 16, wherein each macropixel signal set comprises a red signal, a blue signal, a first green signal, and a second green signal.

* * * * *